INVENTOR.
RICHARD H. GAYLORD
BY
Max L. Wymore
AGENT

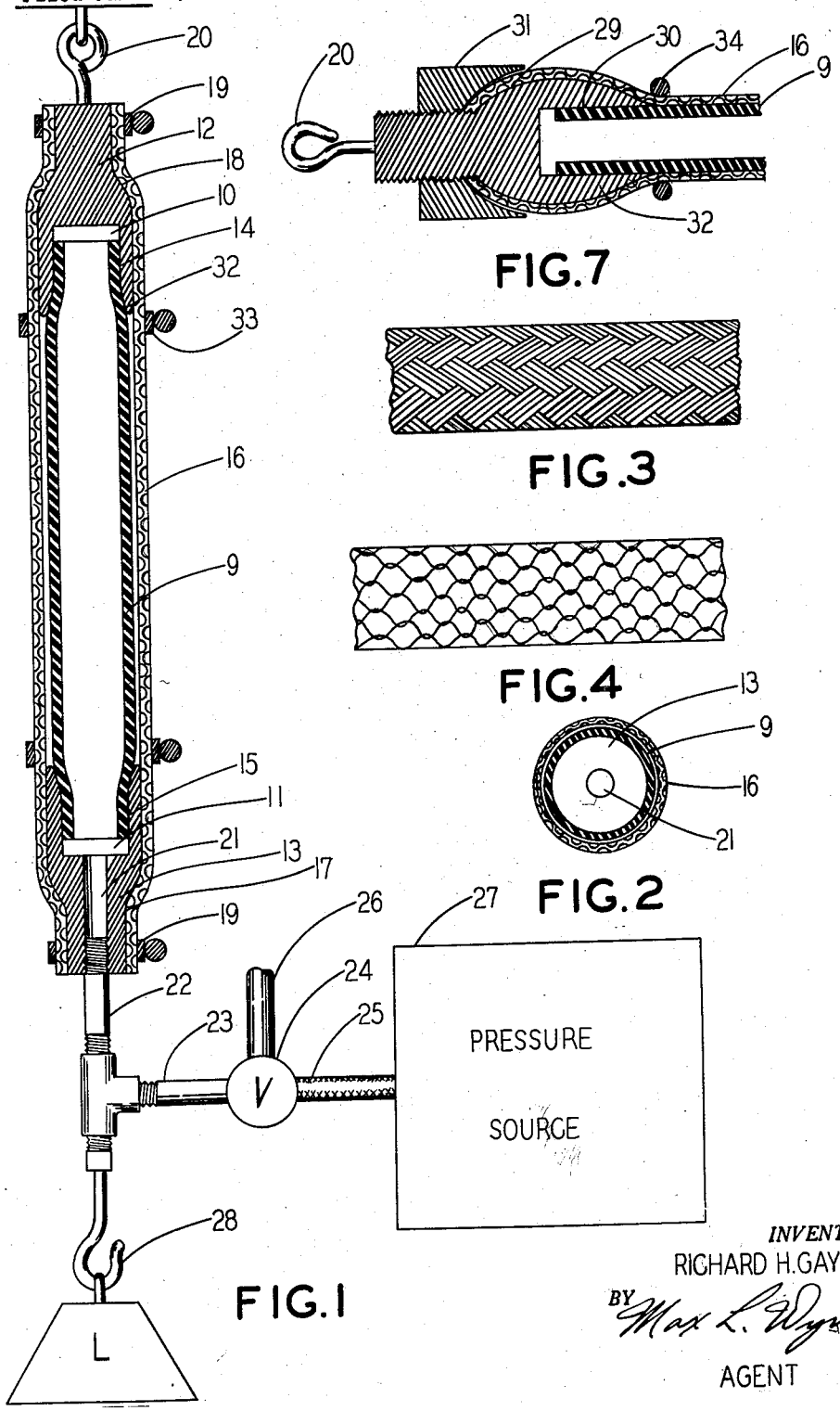

United States Patent Office 2,844,126
Patented July 22, 1958

2,844,126

FLUID ACTUATED MOTOR SYSTEM AND STROKING DEVICE

Richard H. Gaylord, Shaker Heights, Ohio, assignor to Clevite Corporation, Cleveland, Ohio, a corporation of Ohio Application January 20, 1955, Serial No. 483,117

3 Claims. (Cl. 121—48)

This invention relates to a motor system and more particularly to an expansible chamber motor system capable when energized of applying a force against a load.

This application is a continuation in part of my copending application Serial No. 372,130, filed August 3, 1953, for "Fluid Actuated Stroking Device," wherein is disclosed an expansible chamber device comprising a bladder confined within a braided sheath with load fittings attached to each end and adapted to be energized by a fluid.

In the ordinary piston and cylinder, the working surface is the head of the piston and, with this type of construction, it is evident that a large working surface requires a large piston with resulting disadvantages such as bulk and weight. Then too, stroke control under different conditions of operation is often mechanically complicated and the equipment required to do it is expensive to build and operate.

It is an object of the present invention to overcome one or more of the foregoing disadvantages of the conventional piston and cylinder to provide a reciprocating motor system in which the area of working surface is extremely large in relation to total size of the unit and in which the stroke may be varied within wide limits by various expedients which are both inexpensive and easy to accomplish.

It is contemplated according to the present invention to provide a motor system of revolutionary versatility and adaptability to new functions as well as those now performed by rotary and reciprocating engines of either the prime mover or parasitic type.

Another object of the present invention is to provide a mechanically simple, light weight motor system adapted to be energized by both elastic and inelastic fluids and ultimately adaptable to all sorts of uses even under conditions where minimum maintenance is available and reliability must be assured.

In accordance with the invention the novel motor comprises an elongated expansible tubular means surrounded by a woven sheath forming an expansible chamber which contracts in length when expanded circumferentially, a source of fluid under pressure, valve means for selectively and repetitively connecting the chamber with the pressure source and means for imposing a load longitudinally of the chamber.

For a better understanding of the present invention, together with other and further objects thereof, reference is had to the following description taken in connection with the accompanying drawing and its scope will be pointed out in the appended claims;

In the drawings:

Figure 1 is a sectional view of the novel motor device.

Figure 2 is a cross-sectional view of the novel motor device.

Figure 3 shows a portion of a woven sheath in the form of a braid.

Figure 4 shows a portion of a woven sheath in the form of a net or the like.

Figure 7 shows another form of the end fitting of Figure 1.

Figure 5:
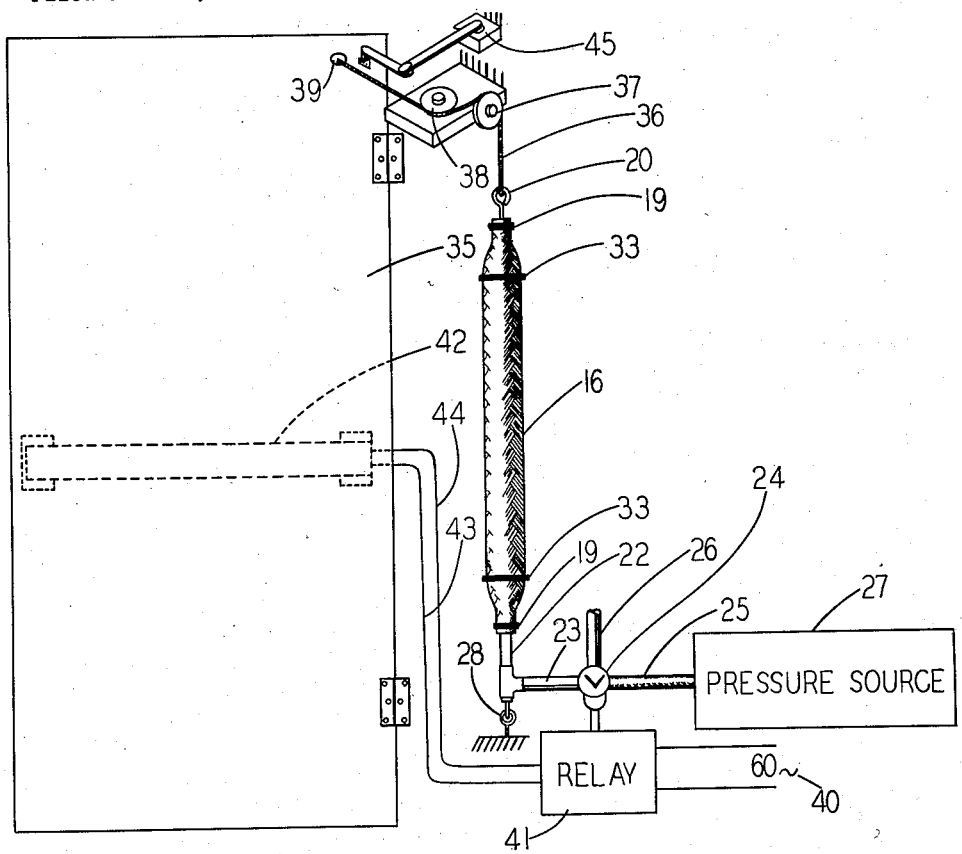
Figure 5 shows a door opening arrangement utilizing the motor device of this invention.
Figure 6:
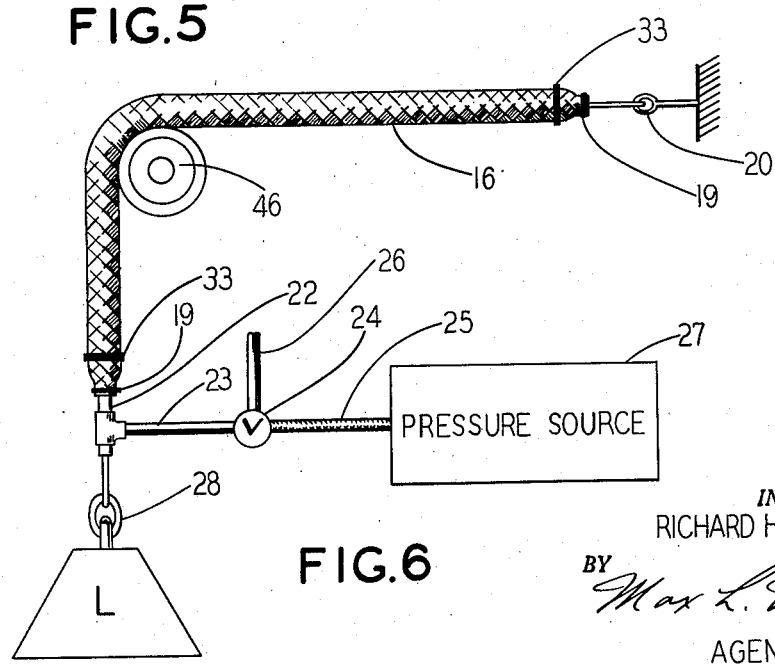
Figure 6 shows a hoist utilizing the motor device of this invention.

Referring to Figure 1 ends of an expansible tube 9 made of rubber and the like are inserted into bores 10 and 11 respectively of end fittings 12 and 13. Bores 10 and 11 are of substantially the same diameter as the outside diameter of tube 9 so that a snug fit is obtained between the tube and shoulders 14 and 15 of the end fittings. A woven sheath 16 of wire, nylon, orlon and the like surrounds tube 9 and passes over end fittings 12 and 13 and is secured to the end fittings behind shoulders 17 and 18 by means of clamps 19. The woven sheath is composed of members individually defined by strands of metal, nylon, orlon and the like, the effective lengths of which are disposed at acute angles with respect to lines on the surface of the sheath 16 drawn parallel to the longitudinal axis thereof, interwoven to form a braid or net and the like of the type evidenced by Figures 3 and 4. End fitting 12 as shown is solid and has an anchor means attached thereto in the form of a hook 20 and the like for applying a load thereto. End fitting 13 has an opening 21 therethrough communicating with the interior of tube 9 and connected to an exterior conduit 22 communicating with a source of liquid under pressure 27 by means of conduit 23, valve 24 and conduit 25 which may be flexible. Valve 24 is adapted to selectively connect conduit 23, conduit 22 and the interior of tube 9 with pressure source 27 or to conduit 26 connected to a source of pressure lower than 27 such as the atmosphere. Valve 24 may be a manually operated valve or an automatically operated valve such as a solenoid valve. An anchor means such as hook 28 may be attached to end fitting 13 by means of conduit 22 for applying a load thereto. Alternatively both end fittings may have a passage therethrough with appropriate valves so the activating fluid may be introduced at one fitting and discharged from the other.

In Figure 4 wherein the sheath is made of woven material, woven in lock stitch fashion such as jersey or net, such as fish net or ladies hosiery, the effective length S is found by a line drawn through adjacent points of contact of consecutive strands. In a fish net the strands may be tied together at these points.

In considering the operation of the device of Figure 1 anchor 20 is fixedly secured while the remaining anchor 28 is affixed to a load to be moved. These, of course, may be reversed. In Figure 1, the load is diagrammatically indicated by the letter L, but, of course, the load might be any sort of a mechanism or part required to be moved. Fluid under pressure is selectively admitted from 27 through valve 24 to the interior of tube 9 to create a pressure differential between the interior and exterior thereof. This pressure differential may likewise be created by reducing the pressure on the exterior of the chamber as by placing the chamber in a vacuum. The expansion of tube 9 as a result of increased pressure therein causes a leak-proof seal to be formed by the tube pressing against shoulders 14 and 15 of the end fittings. The expansion of the tube causes the braided sheath 16 to expand circumferentially and contract lengthwise in a direction parallel to the axis of the tube, applying a force on load L. Upon closing valve 24, disconnecting the interior of tube 9 from the source of fluid under pressure and connecting same with a lower pressure source such as atmosphere and the like, load L by the force of gravity or some other force returns tube 9 and its sheath to the original position. Repetitive opening and closing of valve 24 causes this cycle to be repeated.

When a load is applied to anchors 20 and 28 considerable force is applied to the connection between braid sheath 16 and the end fittings. Shoulders 17 and 18 are provided with a taper tapering inwardly away from seal 14 so that when sheath 16 is subjected to this force the braided structure of the sheath clamps the tapered shoulder more tightly. The greater the force applied the greater the clamping action. A function of the clamps 19 is to prevent the braided sheath from shifting and to provide a portion of the clamping force required, as well as the positioning thereof.

The greater clamping force is realized when the braided sheath is clamped at the smaller end of the taper which accounts for the positioning of clamps 19. Another type end fitting is shown in Figure 7 wherein the outer surface of the coupling member 28 is of eliptical configuration in the longitudinal direction forming a convex curved clamping shoulder 29 tapering in away from seal 30. Nut 31 is provided with a concave curved clamping surface which is a portion of an elipsoid the minor axis of which is longer than that of the elipsoid of the coupling member. Thus when nut 31 is screwed on the coupling member against sheath 16 the greatest clamping force is exerted at the smaller end of the taper of shoulder 29 and decreases proportionally away from this point.

It is preferred to maintain the elastomer tube in contact with the braided sheath throughout its working length. To this end the lip 32 of the end fittings is reduced in thickness at its edge. In some instances the expansion and contraction of the elastomer tube cause the strands of the braid to "creep" or work up the end fitting resulting in a weakening of the braid just below the fitting. This is overcome by providing a restraining means such as a ring 34 or clamp 33 positioned on the braid overlying or just ahead of the end fitting. The restraining means holds braid 16 in contact with elastomer tube 9 on expansion and prevents the braid from working up the fitting.

In considering the theory of operation and the forces operating on the motor, the force output has been found to be, (1) $$F = \frac{P \pi D_{45°}^2}{2}(3 \cos^2 \phi - 1)$$

where:

$F$ = the force exerted by the motor
$P$ = pressure differential
$D_{45°}$ = diameter of the sheath at $\phi=45°$
and $\phi$ = the angle between each effective strand of the sheath and a line drawn upon the surface of the sheath parallel to its longitudinal axis, and the length of the motor is (2) $$L = S \cos \phi$$

where:

$L$ = length
$S$ = effective length of strands forming the motor,
and $\phi$ = the angle between each effective strand of the sheath and a line drawn upon the surface of the sheath parallel to its longitudinal axis.

It follows from Equations 1 and 2 that, without load, maximum contraction occurs when (3) $$L = S \frac{1}{\sqrt{3}} = S(.577)$$

or when $\phi = 55°40'$ since the force output will be zero at this point. This corresponds to a contraction of approximately 30% in length since at the extended position cos $\phi$ can seldom exceed 0.9 in a braid made of sufficient material to be reasonably durable.

When $\phi=45°$ the force output of the motor is equal to that of a piston and cylinder of the same diameter. At this angle (4) $$\cos \phi = \sqrt{½}$$

Substituting (4) in (1) gives the well known equation for the output of a piston and cylinder.

(5) $$F = \frac{P \pi D_{45°}^2}{4} = P \pi r_{45°}^2$$

It is usual in the applications of the motor to consider its stroke to terminate at $\phi=45°$ and operate between this and an extended length of S(.9). Under this mode of operation the stroke is approximately 20% of the extended length. The force exerted by the motor or the force output at the beginning of stroke from the extended position is three times that exerted by a piston and cylinder of the same diameter and is equal to the output of such a piston and cylinder at the end of stroke where $\phi=45°$.

Figure 5 shows one embodiment of the motor of this invention as a door opener. In this application anchor 28 is fixedly secured to the wall adjacent the hinge side of the door 35. Anchor 20 is connected to a cable 36 which passes over pulleys 37 and 38 and is fastened to door 35 at point 39. Pulleys 37 and 38 are fixedly secured to the wall and arranged to transform the vertical motion of the cable into motion in a horizontal plane. Valve 24, a 3-way solenoid operated valve, is actuated by a voltage source 40 through the action of relay 41. Relay 41 is energized by a touch plate switch 42 connected to relay by electrical conductors 43 and 44. Switch 42 may be a contact switch, capacity switch, photoelectric switch or the like. Preferably a time delay is provided in relay 41 to hold the door open on actuation for a short period of time before permitting it to close. The actuation of relay 41 or even valve 24 may be affected by mechanical linkage. A door closer 45 provides the load L against which the motor device acts.

The activation of relay 41 by closing switch 42 applies a potential from source 40 to the solenoid valve 24. Valve 24 opens, connecting the interior of the motor device to a pressure source 27. The contraction of the motor device produces a pulling force on cable 36 which is applied to point 39 on door 35 through pulleys 37 and 38 causing door 35 to be opened against the force applied by door closer 45. A time delay in relay 41 holds valve 24 open until the door is completely open. Relay 41 is then deactivated, allowing valve 24 to close and connect the interior of the motor device to the atmosphere or the like whereby the motor device elongates and the door closer closes the door.

Figure 5 shows an embodiment of the motor device of this invention wherein it is used as a hoist where a lift for a considerable distance is desired. Anchor 20 of the motor device is fixedly secured to a wall. The motor device is run horizontally to a pulley 46, passes over the pulley and downwardly forming a vertical portion. Anchor 28 is connected to a load L. On applying pressure from a source 27 through valve 24 to the interior of the motor device both the horizontal and vertical portions contract and the total contraction of both portions are applied to load L.

Although the above-described embodiments disclose the invention as applied to specific applications it will be appreciated that its use in any application where a load is to be moved is contemplated. With suitable mechanical linkage arrangements the invention may be used to produce a pushing action.

While there have been described what at present are considered to be the preferred embodiments of this invention it will be obvious to those skilled in the art that various changes and modifications may be made therein without departing from the invention. It is aimed therefore in the appended claims to cover all such changes and modifications which fall within the true spirit and scope of the invention.

I claim:

1. In a motor of the expansible chamber class, in combination, a flexible elastomer tube, a coupling member having therein a bore adapted to receive said tube in close fitting relationship to provide a fluid tight seal and having a tapered shoulder on the outer surface, located beyond and tapering inwardly away from the seal, a braided sheath surrounding said tube and extending beyond the sealed end thereof and lying over the shoulder portion of said coupling member and clamping means engaging the extended end of the braided sheath.

2. In a motor of the expansible chamber class, in combination, a flexible elastomer tube, a coupling member having therein a bore adapted to receive said tube in close fitting relationship to provide a fluid tight seal and having a tapered shoulder on the outer surface located beyond and tapering inwardly away from the seal, a braided sheath surrounding said tube and extending beyond the sealed end thereof and lying over the shoulder portion of said coupling member and clamping means engaging and compressing the extended end of the braided sheath against the tapered shoulder in a manner to apply greater clamping force at a point thereon more closely adjacent to the axis of the coupling member than at a point less closely adjacent thereto.

3. In a motor of the expansible chamber class, in combination, an elongated expansible member, a pair of end fittings each provided with a bore adapted to receive an end of said expansible member, a braided sheath surrounding said expansible member and said end fittings and fixedly secured to each end fitting defining a substantially fluid tight expansible chamber, and conduit means between the interior of said chamber and the exterior of same.

References Cited in the file of this patent

UNITED STATES PATENTS

| | | |
|---|---|---|
| 647,671 | De Lew | Apr. 17, 1900 |
| 973,051 | King | Oct. 18, 1910 |
| 1,630,810 | Simpson | May 31, 1927 |
| 2,483,088 | De Haven | Sept. 27, 1949 |
| 2,642,091 | Morin | June 16, 1953 |

FOREIGN PATENTS

| | | |
|---|---|---|
| 951,885 | France | Apr. 25, 1949 |